United States Patent
Lennen

(10) Patent No.: US 10,024,976 B2
(45) Date of Patent: Jul. 17, 2018

(54) METHOD AND APPARATUS FOR REDUCING MEMORY AND COMMUNICATIONS BANDWIDTH REQUIREMENTS IN GNSS RECEIVERS

(71) Applicant: Samsung Electronics Co., Ltd., Gyeonggi-do (KR)

(72) Inventor: Gary Lennen, Cupertino, CA (US)

(73) Assignee: Samsung Electronics Co., Ltd (KR)

( * ) Notice: Subject to any disclaimer, the term of this patent is extended or adjusted under 35 U.S.C. 154(b) by 1164 days.

(21) Appl. No.: 14/079,238

(22) Filed: Nov. 13, 2013

(65) Prior Publication Data

US 2015/0054680 A1 Feb. 26, 2015

Related U.S. Application Data

(60) Provisional application No. 61/868,302, filed on Aug. 21, 2013.

(51) Int. Cl.

| G01S 19/37 | (2010.01) |
|---|---|
| G01S 19/13 | (2010.01) |
| G01S 19/39 | (2010.01) |
| G01S 19/09 | (2010.01) |
| G01S 19/24 | (2010.01) |

(52) U.S. Cl.
CPC .............. *G01S 19/37* (2013.01); *G01S 19/09* (2013.01); *G01S 19/13* (2013.01); *G01S 19/39* (2013.01); *G01S 19/246* (2013.01)

(58) Field of Classification Search
CPC ........... G01S 19/13; G01S 19/36; G01S 19/37
See application file for complete search history.

(56) References Cited

U.S. PATENT DOCUMENTS

| 8,362,952 B2 | 1/2013 | Brenner | |
|---|---|---|---|
| 2009/0196513 A1* | 8/2009 | Tian ...................... | H04N 19/60 382/232 |
| 2010/0074308 A1 | 3/2010 | Young | |
| 2010/0085224 A1* | 4/2010 | Monro ................ | H03M 7/3082 341/107 |
| 2011/0039506 A1* | 2/2011 | Lindahl ................... | G10L 19/20 455/130 |
| 2011/0078222 A1 | 3/2011 | Wegener | |
| 2011/0279324 A1* | 11/2011 | Bolotski ................. | G01S 19/30 342/451 |
| 2012/0157852 A1 | 6/2012 | Wegener et al. | |

* cited by examiner

*Primary Examiner* — Cassi J Galt
(74) *Attorney, Agent, or Firm* — The Farrell Law Firm, P.C.

(57) ABSTRACT

A method, apparatus, and system for reducing memory and communication bandwidth requirements for digital signal samples in Global Navigational Satellite System (GNSS) receivers using an adaptive compression/decompression process are described.

20 Claims, 6 Drawing Sheets

METHOD AND APPARATUS FOR REDUCING MEMORY AND COMMUNICATIONS BANDWIDTH REQUIREMENTS IN GNSS RECEIVERS

PRIORITY

This application claims priority under 35 U.S.C. § 119(e) to U.S. Provisional Patent Application Ser. No. 61/868,302 filed on Aug. 21, 2013, the entire disclosure of which is incorporated herein by reference.

BACKGROUND OF THE INVENTION

1. Field of the Invention

The present invention relates generally to reducing memory and communication bandwidth requirements in Global Navigational Satellite System (GNSS) receivers and, more particularly, to reducing memory and communication bandwidth requirements for digital signal samples in GNSS receivers.

2. Description of the Related Art

Satellite navigational systems provide positional and timing information to earth-bound receivers. Each system has its own constellation of satellites orbiting the Earth, and, in order to calculate its position, a receiver on Earth uses the satellites "in view" (i.e., in the sky above) from that system's constellation. "Global Navigational Satellite Systems" (GNSS) is often used as the generic term for such systems, even though such navigational satellite systems include regional and augmented systems—i.e., systems that are not truly "global." The term "GNSS," as used herein, covers any type of navigational satellite system, global or not, unless expressly indicated otherwise.

GNSS systems, presently operational and planned, include the widely-known, widely-used, and truly global Global Positioning System (GPS) of the United States, Russia's GLObalnaya NAvigatsionnaya Sputnikovaya Sistema (GLONASS), Europe's Galileo and China's BeiDou (also known, in its second generation, as COMPASS) systems—each of which has, or will have, its own constellation of satellites orbiting the globe. Regional systems (those that are not global, but intended to cover only a certain region of the globe) include Japan's Quasi-Zenith Satellite System (QZSS) and the Indian Regional Navigational Satellite System (IRNSS) currently being developed. Augmented systems are normally regional as well, and "augment" existing GNSS systems with, e.g., messages from ground-based stations and/or additional navigational aids. These include the Wide Area Augmentation System (WAAS), European Geostationary Navigation Overlay Service (EGNOS), Multi-functional Satellite Augmentation System (MSAS), and GPS Aided Geo Augmented Navigation (GAGAN). Regional GNSS systems, such as QZSS, can also operate as augmented systems.

GNSS receiver architectures vary in detail depending on the specific implementation, as is well-known to one of ordinary skill in the art, but there are certain functions and/or components that must be addressed by any GNSS receiver. All GNSS receiver architectures have an antenna and a reception chain of components for taking the GNSS signals received by the antenna and shaping, filtering, amplifying, and down-converting the received signals from their received Radio Frequency (RF) to an Intermediate Frequency (IF), which is better for further processing. All of this typically occurs in the analog domain, and the last stage in the reception chain is the conversion from the analog signal to a digital signal and it is this digital signal which is further processed to extract the GNSS signal information.

Several types of GNSS receiver architectures temporarily store and/or forward, over a communication channel, the GNSS signals after they have been digitized. Three such architectures are described below, in reference to FIGS. 1-3, where the GNSS receiver architecture in FIG. 1 is a simple sample-and-store memory, the GNSS receiver architecture in FIG. 2 has a circular memory buffer, and the GNSS receiver architecture in FIG. 3 transmits the digital signal over a communications channel for further processing at a remote location (remote, that is, from the GNSS receiver architecture). FIGS. 1-3 are only examples of the types of receiver architectures, and specific implementations in GNSS receivers may include features of two or more of the architectures shown in FIGS. 1-3, as would be known to one of ordinary skill in the art.

In FIG. 1, antenna 110 in GNSS receiver 100 receives the GNSS signal, which is then processed by reception chain (RX) 120. Analog-to-Digital Converter (ADC) 130 takes the processed analog GNSS signal and converts it to a digital signal, where each digital sample output has N bits. In FIG. 1, the time interval for each sample is one (1) second, and each 1-second N-bit sample is stored in memory 150, where they are available to microprocessor 160 for further processing. Microprocessor 160 processes the digital samples from memory 150 to produce a navigation and timing solution.

In the circular memory buffer architecture shown in FIG. 2, antenna 210 in GNSS receiver 200 receives the GNSS signal, which is then processed by reception chain (RX) 220. Analog-to-Digital Converter (ADC) 230 takes the processed analog GNSS signal and converts it to a digital signal, where each digital sample output has N bits. By contrast with FIG. 1, the digital samples output by ADC 230 in FIG. 2 are input to a sample pre-processing module 240, which processes them into M-bit samples, each of which is of K msecs duration. These K msec M-bit samples are stored in memory 250, and then forwarded to sample post-processing module 245, which outputs the post-processed samples to microprocessor 260 at an accelerated clock rate. Microprocessor 260 processes the post-processed digital samples to produce a navigation and timing solution.

In the architecture shown in FIG. 3 which transmits digital signal samples over a communication channel, antenna 310 in GNSS receiver 300 receives the GNSS signal, which is then processed by reception chain (RX) 320. Analog-to-Digital Converter (ADC) 330 takes the processed analog GNSS signal and converts it to a digital signal, where each digital sample output has N bits. Each output N-bit digital signal sample is stored in memory 350, which is typically sized at several kilobytes. In FIG. 3, the digital samples stored in memory 350 are transmitted over a communication channel to a remote processing unit 360, which processes the received digital samples to produce a navigation and timing solution. This type of architecture can be used when the GNSS receiver 300 is not suitable for computation-intensive signal processing, which is better performed at a computer processing location. In some versions of this architecture, the digital samples are further processed before being transmitted over the communication channel.

In the archetype GNSS receiver architectures shown in FIGS. 1-3, as well as all other GNSS receiver architectures, resources including, without limitation, power, space, and circuitry, are required to store the digital samples in memory before processing by the microprocessor. In the GNSS architecture of FIG. 3, those resources include the transmit power, timing, and circuitry, as well as the bandwidth for transmitting the digital samples to the remote processing unit 360. Such resources are at a premium, especially when the GNSS receiver is in a portable device, such as a cellular phone, a tablet or laptop computer, a portable navigational device (such as a GPS receiver), or any of the myriad of portable personal consumer electronic devices which include any type of GNSS signal processing capability. The term "portable device" as used herein, covers any such implementation of GNSS capabilities in a device or system.

Because portable devices run on battery power at least a part of the time, any use of power, such as for memory storage and/or transmitting communication signals, is a drain. Moreover, to remain portable, portable devices must keep their internal circuitry to a minimum, and in GNSS receivers, a substantial portion of the silicon area is used just for memory.

Thus, there is a need, such as when a GNSS receiver is implemented in a portable device, which runs on battery power at least a part of the time, and may have limited interior space for circuitry, to minimize the resources needed for GNSS signal digital sample storage and/or transmission.

SUMMARY OF THE INVENTION

The present invention addresses at least the problems and disadvantages described above and provides at least the advantages described below. According to one aspect of the invention, the memory required for storage of GNSS digital signal samples is reduced. According to another aspect of the invention, the bandwidth required for transmission of GNSS digital signal samples is reduced. According to yet another aspect of the present invention, GNSS digital signal samples are reduced in size by appropriate pre-coding before storage and/or transmission, and decoded when accessed from storage and/or received over a communication channel, such that they may be processed for GNSS navigation and timing solutions.

According to an embodiment of the present invention, a method for a receiver of signals from a satellite navigational system includes receiving a signal from one or more satellites in the satellite navigational system; sampling the signal to output digital signal samples, each digital signal sample having N bits; compressing the digital signal samples to an average sample size less than N bits; storing the compressed digital signal samples; retrieving and decompressing the stored digital signal samples, each decompressed digital signal sample having N bits; and processing the decompressed digital signal samples to generate at least one of a navigational, position, and timing solution from the received signal.

According to another embodiment of the present invention, a method for a receiver of signals from a satellite navigational system includes receiving a signal from one or more satellites in the satellite navigational system; sampling the signal to output digital signal samples; encoding the digital signal samples; storing the encoded digital signal samples; monitoring one or more conditions of at least one of the receiver and the satellite navigational system; retrieving and decoding the stored digital signal samples; processing the decoded digital signal samples to generate at least one of a navigational, position, and timing solution from the signal received from the one or more satellites in the satellite navigational system; determining, based on the monitored conditions, if one or more parameters of at least one of coding and decoding the digital signal samples should be changed; and changing one or more parameters for at least one of coding and decoding the digital signal samples if it is determined the parameters should be changed based on the monitored conditions.

According to yet another embodiment of the present invention, a satellite navigational system receiver includes at least one antenna configured to receive a signal from one or more satellites in a satellite navigational system; an ADC configured to sample the received signal and to output digital signal samples, each digital signal sample having N bits; a compression module configured to compress the digital signal samples to an average sample size less than N bits; a memory configured to store the compressed digital signal samples; a decompression module configured to decompress the stored digital signal samples, each decompressed digital signal sample having N bits; and a processor configured to process the decompressed digital signal samples to generate at least one of a navigational, position, and timing solution from the signal received from the one or more satellites in the satellite navigational system.

According to a further embodiment of the present invention, a portable device includes at least one antenna configured to receive a signal from one or more satellites in a satellite navigational system; an ADC configured to sample the received signal and to output digital signal samples, each digital signal sample having N bits; a memory configured to store the digital signal samples; and one or more processors; and at least one non-transitory computer-readable medium having program instructions recorded thereon, the program instructions configured to have the one or more processors perform the steps of: compressing the digital signal samples output by the ADC, prior to storage in the memory, to an average sample size less than N bits; and decompressing the compressed digital signal samples when retrieved from memory, each decompressed digital signal sample having N bits.

According to a still further embodiment of the present invention, a satellite navigational system includes (i) a receiver which includes at least one antenna configured to receive a signal from one or more satellites in a satellite navigational system; an analog-to-digital convertor (ADC) configured to sample the received signal and to output digital signal samples; a compression module configured to encode the digital signal samples; and a transmitter configured to transmit the encoded digital signal samples; and (ii) a remote processing unit which includes a receiver configured to receive the transmitted encoded digital signal samples; a decompression module configured to decode the received digital signal samples; and a processor configured to process the decoded digital signal samples to generate at least one of a navigational, position, and timing solution from the signal received from the one or more satellites in the satellite navigational system.

BRIEF DESCRIPTION OF THE DRAWINGS

The above and other aspects, features and advantages of certain embodiments of the present invention will become more apparent from the following detailed description taken in conjunction with the accompanying drawings, in which.

DETAILED DESCRIPTION OF EMBODIMENTS OF THE PRESENT INVENTION

Figure 1:
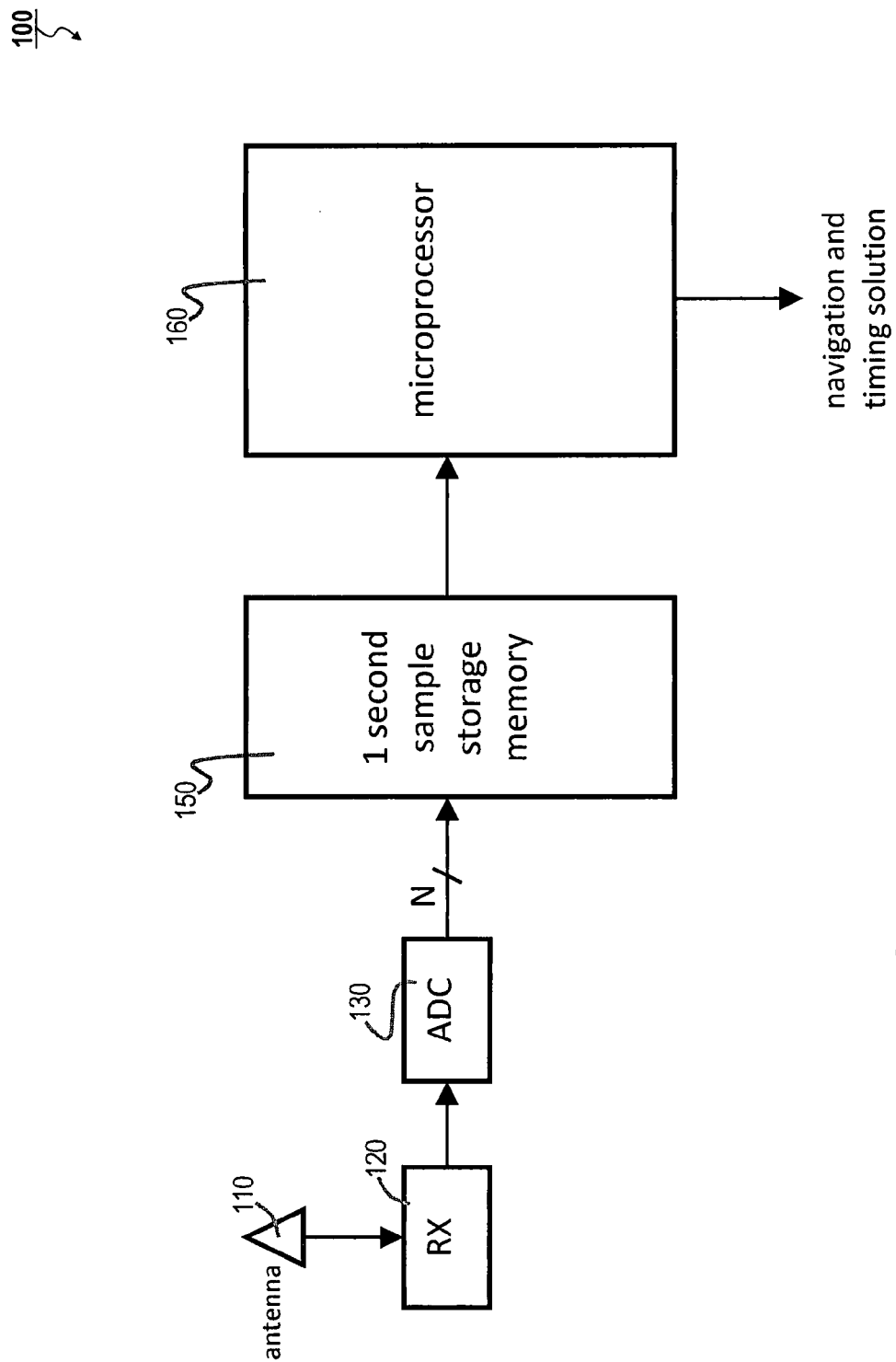
FIG. 1 illustrates a GNSS receiver architecture having a simple sample-and-store memory for GNSS digital signal samples, to which embodiments of the present invention are applied.

Various embodiments of the present invention will be described in detail below with reference to the accompanying drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are illustrated in block diagram form in order to facilitate describing the claimed subject matter.

According to embodiments of the present invention, the amount of memory storage and/or communications bandwidth required for GNSS digital signal samples is reduced by compressing the samples before storing and/or transmitting, and then decompressing the samples when removed from storage and/or received. Moreover, according to embodiments of the present invention, the reduction in memory/bandwidth is adaptive, changing the level of signal sample compression based on GNSS signal conditions. In one embodiment, the received-carrier-power-to-receiver-noise-power-density ($C/N_O$) is the monitored GNSS signal condition. The $C/N_O$ ratio represents whether the GNSS receiver can lock on to the carrier signal and retrieve the data encoded thereon, given the amount of noise present in the received signal.

Figure 4:
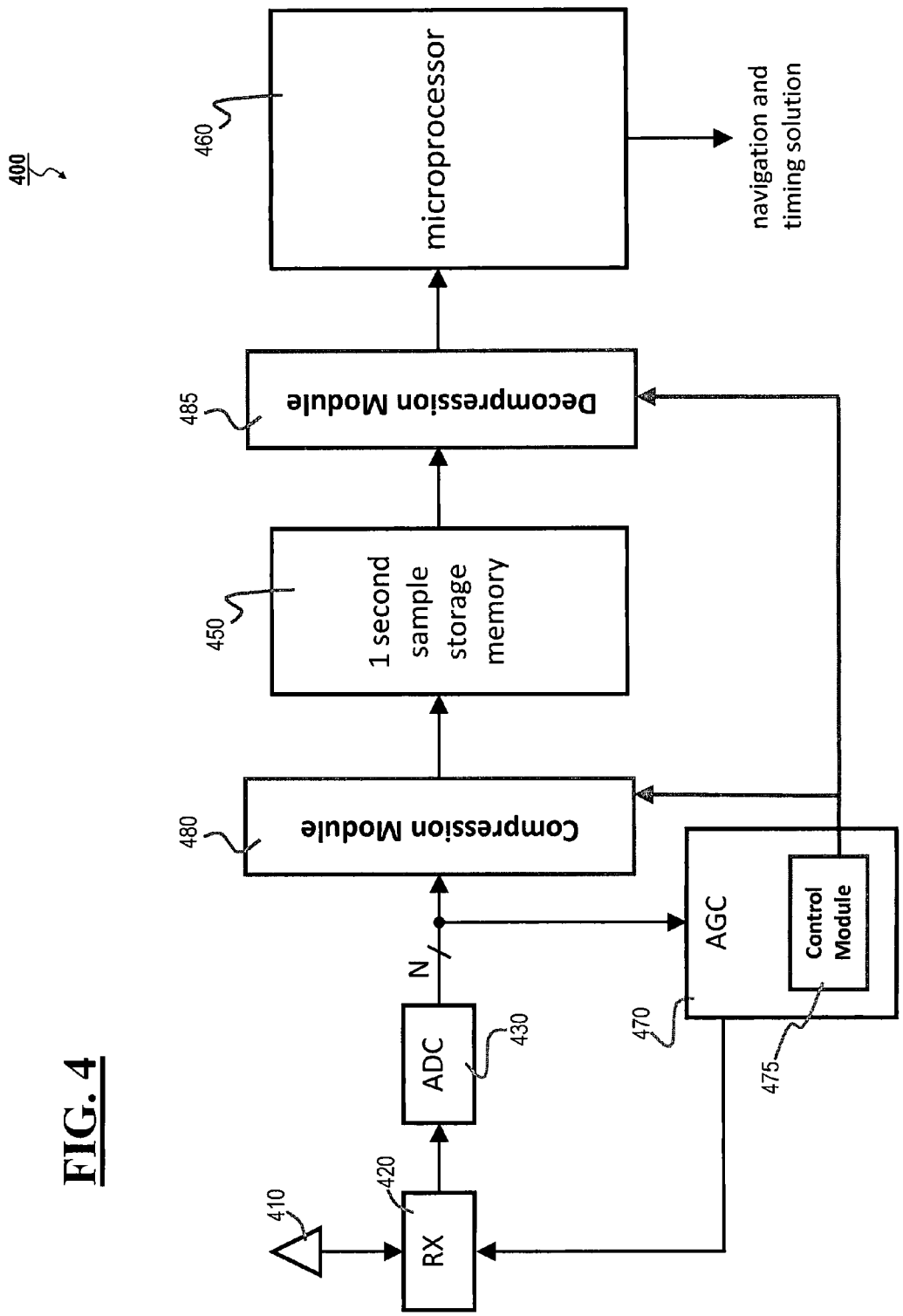
FIG. 4 illustrates a simple sample-and-store memory GNSS receiver architecture with GNSS digital signal sample compression and decompression according to an embodiment of the present invention.

FIG. 4 illustrates a simple sample-and-store memory GNSS receiver architecture where the GNSS digital signal samples are compressed and decompressed according to an embodiment of the present invention. Antenna 410 in GNSS receiver 400 receives the GNSS signal, which is then processed by reception chain (RX) 420. Analog-to-Digital Converter (ADC) 430 samples the processed analog GNSS signal at sampling rate $F_S$, thereby converting the received and processed analog GNSS signal to a digital signal, where each digital sample output has N bits. The time interval for each sample is one (1) second, and thus ADC 430 outputs 1-second N-bit samples.

In FIG. 4, the 1-second N-bit samples output from ADC 430 are input into Compression Module 480, according to an embodiment of the present invention. The Compression Module 480 compresses the N-bit samples using a compression algorithm. The compression algorithm according to embodiments of the present invention can be lossless or lossy. A lossless compression algorithm according to embodiments of the present invention must significantly compress the percentage of bits. Thus, for example, a run length encoding lossless compression algorithm can be used in embodiments of the present invention, but would likely be ineffective because this type of algorithm requires there to be a prevalence of runs of the same data to effectively compress the data, i.e., not a random noise-like transmission channel. A lossy compression algorithm according to embodiments of the present invention must not adversely impact the $C/N_O$. The lost information caused by a "lossy" algorithm (i.e., an algorithm where some data is permanently lost and can not be corrected/retrieved in decompression) translates into lost $C/N_O$ for the received satellites in the GNSS receiver context. Thus, if half the bits are lost, then there is a 3 dB $C/N_O$ unfixable loss, which is considered unacceptable for most GNSS operations. Huffman coding is an example of a lossless compression algorithm that is quite suitable for the channel/sample conditions in a GNSS receiver, and thus quite suitable for embodiments of the present invention.

The details of a specific embodiment using Huffman coding for its compression algorithm is discussed further below. The compressed samples from Compression Module 480 are then stored in memory 450, which thereby uses less storage due to the compression. When the digital samples are needed for microprocessor 460, they are output from memory 450 to Decompression Module 485, which decompresses the compressed samples back to their original state before entering Compression Module 480. The Compression and Decompression Modules 480 and 485 may be implemented in any of hardware, software, or a combination of the two, as would be known to one of ordinary skill in the art. Microprocessor 460 processes the digital samples to produce a navigation and timing solution.

The embodiment of the present invention shown in FIG. 4 also has Automatic Gain Control (AGC) 470, which monitors the output of ADC 430 and changes one or more operating parameters of one or more components of reception chain 420. An AGC is commonly used to control the gain of components in the front end (i.e., reception chain 420) to ensure a steady and regular output from ADC 430; however, as shown in the embodiment in FIG. 4, AGC 470 also has Control Module 475 which, through AGC 470, monitors GNSS signal conditions and their effects on the output of ADC 430. As discussed further below, Control Module 475 uses this information to set and/or modify parameters for the compression/decompression process in Compression Module 480 and Decompression Module 485. Control Module 475 may be implemented in any of hardware, software, or a combination of the two, as would be known to one of ordinary skill in the art, but in this embodiment, Control Module 475 is implemented as part of and/or together with the control software/program for AGC 470.

Figure 2:
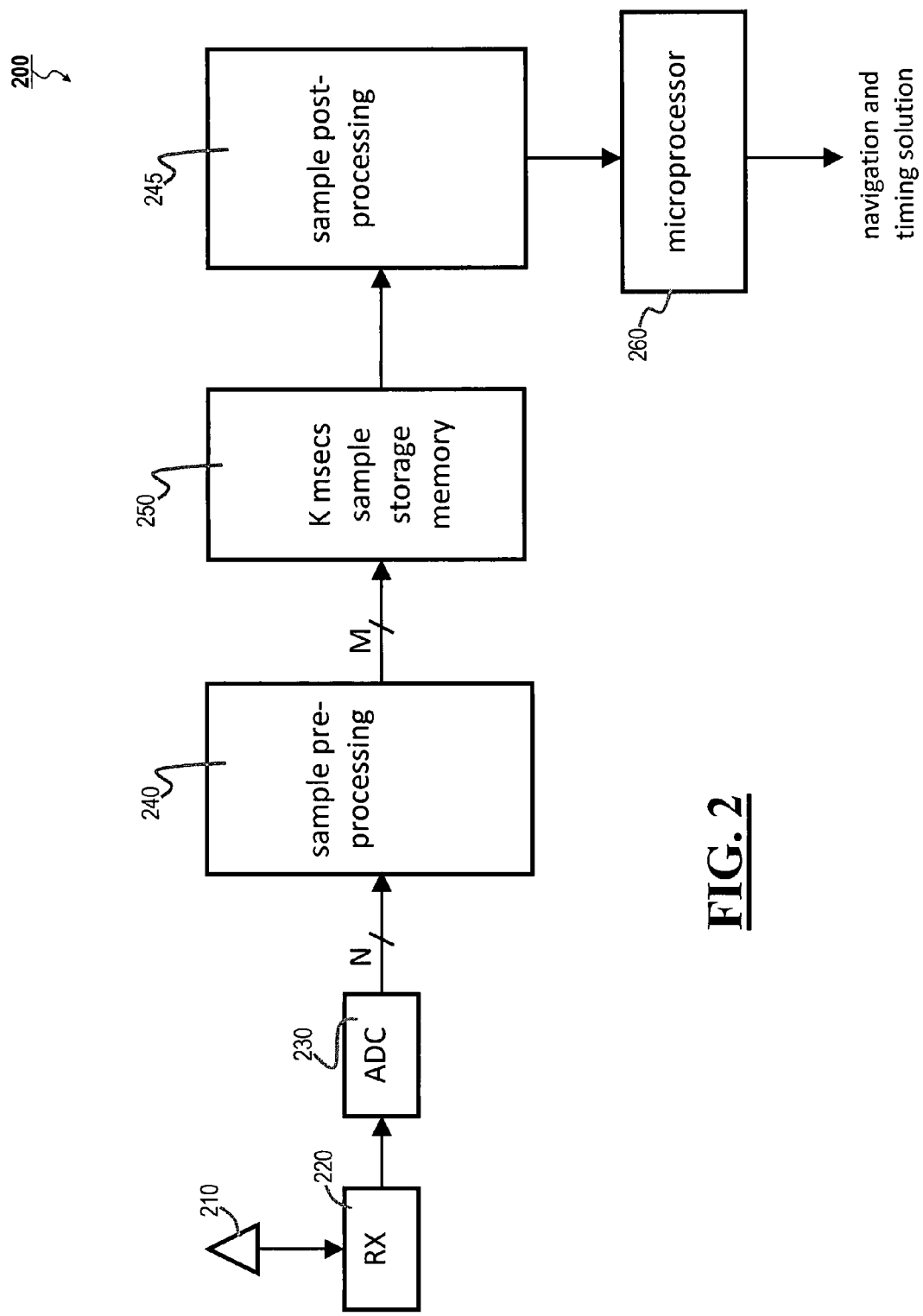
FIG. 2 illustrates a GNSS receiver architecture having a circular memory buffer for GNSS digital signal samples, to which embodiments of the present invention are applied.
Figure 3:
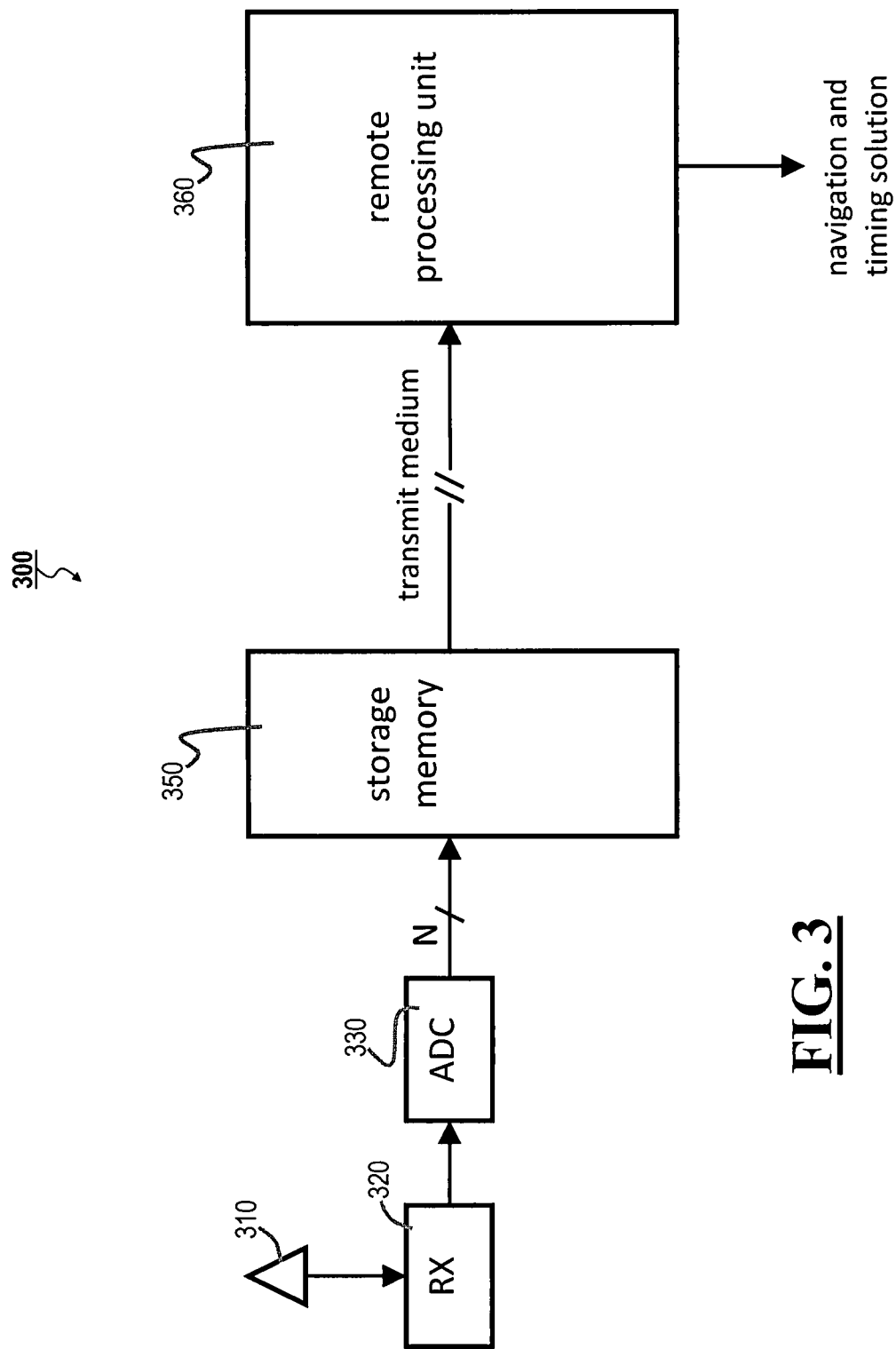
FIG. 3 illustrates a GNSS receiver architecture where the GNSS digital signal samples are transmitted over a communications channel for further processing at a remote location, to which embodiments of the present invention are applied.

For simplicity of presentation, the embodiment of the present invention in FIG. 4 is applied to the simple sample-and-store memory GNSS receiver architecture illustrated in FIG. 1; however, embodiments of the present invention can be similarly applied to the architectures shown in FIGS. 2 and 3, as well as to other GNSS receiver architectures, as would be understood by one of ordinary skill in the art. For example, when implementing an embodiment of the present invention in an architecture like that shown in FIG. 2, the Compression Module could be placed either inside or outside sample pre-processing module 240, as long as the Decompression Module is placed at the "mirror" location on the other side of memory 250, i.e., inside or outside sample post-processing module 245, respectively. As another example, in a GNSS receiver architecture where the GNSS digital signal samples are transmitted over a communications channel for further processing at a remote location, such as the one illustrated in FIG. 3, the digital signal samples would be compressed before transmission and decompressed after reception.

In one embodiment of the present invention, Huffman coding is used as the compression algorithm. Huffman coding assigns a number of bits to each symbol based on the probability of that particular symbol being transmitted, e.g., being used in any message. Thus, as a simplified example, when coding English language messages, and thus when the alphabet represents all possible symbols, Huffman coding would assign only three bits to code commonly used letters like "a", "e", and "i" and assign 10 or more bits to infrequently-used letters like "z" and "x". The probability, or weight, of each symbol dictates the number of bits used to represent it. The English message example here is simplified, as one of ordinary skill in the art implementing Huffman coding can use various algorithms, procedures, and parameters to assign both the number and value (0 or 1) of the bits in the codewords assigned to each letter. Huffman coding results in compression because less bits are used to code commonly used symbols, even though a relatively large number of bits may be used to code uncommon symbols. Using the English language example, an unencoded message using the standard 8 bits to represent each letter in the alphabet will, in most cases, have more bits than the same message coded using Huffman coding.

A simpler example of symbols than the English language alphabet is the output of a typical ADC, which is commonly two bits, one bit for magnitude, the other indicating the sign.

When two bit quantization is being used for sampling of GNSS signals, one of the set {−3, −1, +1, +3} is output every clock, which corresponds to the output set {11, 01, 00, 10} (the second bit represents the sign). Although the ADC outputs one of {11, 01, 00, 10} every clock cycle, each symbol (2-bit sample) does not have equal weight (probability of occurrence). If P(S) equals the weight of symbol S, P(+3)+P(−3)≈0.30, while P(+1)+P(−1)≈0.70, assuming minimized $C/N_O$ loss in the presence of Gaussian noise. If Huffman coding is applied, one gets:

TABLE 1

Compression by
Huffman Coding of 2-bit Quantization ADC Output

| Quantization value | Output Bits | Compressed (Huffman coded) |
|---|---|---|
| −3 | 11 | 110 |
| −1 | 01 | 0 |
| +1 | 00 | 10 |
| +3 | 10 | 111 |

Although the least probable symbols (−3, +3) use 3 bits—more than the uncompressed two bits normally used to store those symbols, one of the most probable symbols (−1) uses only one bit, and the other most probable symbol (+1) uses two bits.

Thus, although normally one of the set {11, 01, 00, 10} is output by ADC 130 and stored by memory 150 in FIG. 1, in the embodiment of the present invention shown in FIG. 4, the output of ADC 430 is coded/compressed to one of the set {110, 0, 10, 111} by Compression Module 480 before being stored in memory 450. This results in an overall reduction, because the average number of bits stored will be less when Compression Module 450 in FIG. 4 uses the Huffman coded/compressed digital samples. While the number of bits in FIG. 1 is always two, and thus the average is two, the average number of bits used to store the Huffman coded/compressed samples in FIG. 4 is:

P(−3)×3 bits+P(−1)×1 bit+P(+1)×2 bits+P(+3)×3
bits=Ave. No. of Bits Stored 0.15×3+0.35×1+
0.35×2+0.15×3=1.95 bits Thus, the rate of compression is 2.5%. The rate of compression using Huffman coding increases as the symbol alphabet increases. Thus, since the GNSS signal, and thus the ADC output in a GNSS receiver, usually has I and Q components, each having a two-bit sample per clock cycle, Compression Module 480 would have 4 bits to compress every clock cycle, resulting in a 16 symbol alphabet, and an even greater compression rate. Similarly, in some embodiments of the present invention, Compression Module 480 could compress more than one sample at a time in order to increase the compression rate. Of course, this would mean the same number of samples would have to be decompressed at one time when output from storage. Applying Huffman coding to compress two 2-bit samples at a time, one gets:

TABLE 2

Compression by
Huffman Coding of Two 2-bit ADC Samples

| Quantization values | Output Bits | Compressed (Huffman coded) |
|---|---|---|
| −3, −3 | 1111 | 101110 |
| −3, −1 | 1101 | 1001 |
| −3, +1 | 1100 | 10000 |
| −3, +3 | 1110 | 101111 |
| −1, −3 | 0111 | 00111 |
| −1, −1 | 0101 | 11 |
| −1, +1 | 0100 | 010 |
| −1, +3 | 0110 | 00100 |
| +1, −3 | 0011 | 00101 |
| +1, −1 | 0001 | 011 |
| +1, +1 | 0000 | 000 |
| +1, +3 | 0010 | 1010 |
| +3, −3 | 1011 | 101100 |
| +3, −1 | 1001 | 10001 |
| +3, +1 | 1000 | 00110 |
| +3, +3 | 1010 | 101101 |

Figure 6:
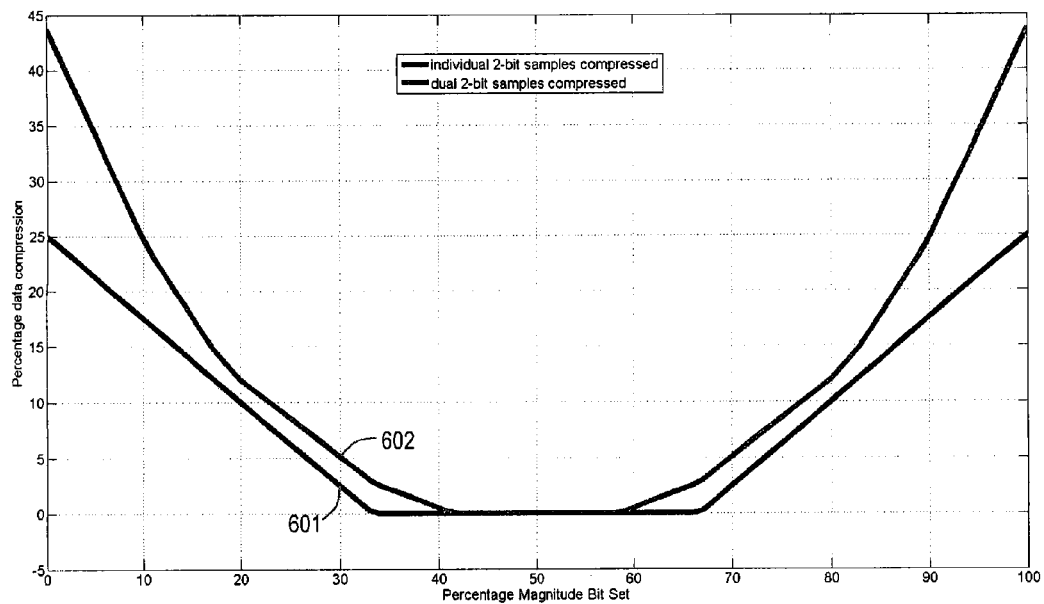
FIG. 6 is a graph of data compression percentage vs. magnitude bit set percentage for single and double two-bit samples, according to an embodiment of the present invention.

Assuming the same probabilities as before, the rate of compression using the Huffman coding alphabet in Table 2 is 5%. FIG. 6 graphs the data compression vs. the magnitude bit set percentage for both the single 2-bit case, i.e., Table 1, and the double 2-bit case, i.e., Table 2, with lines 601 and 602, respectively. Assuming P(+3)+P(−3)≈0.30 and P(+1)+P(−1)≈0.70, i.e., minimized $C/N_O$ loss in the presence of Gaussian noise, line 601 has the value 2.5% at both 30 and 70, while line 602 has the value 5% at both 30 and 70. With the graph in FIG. 6, one can see how the data compression rate will change based on the weight of the four possible symbols (−3, −1, +1, +3). Clearly, the data compression weight increases the more out of balance the weights are, i.e., the further one goes from the center point 50, which represents when all symbols have an equal probability of occurrence.

Most GNSS receiver systems use 1-, 2-, or 3-bit quantization schemes, and the present invention would apply to any of those schemes, as well as any other scheme, regardless of the number of bits, sampling rate, etc.

However, the tables above assume minimized $C/N_O$ loss in the presence of Gaussian noise, while in reality GNSS signal conditions change over time, and are subject to burst noise and local interferors, etc., which means the compression/decompression process according to the present invention must be adaptive to guarantee that less memory is used, rather than more. For example, the Huffman alphabets above rely upon each symbol being given a weight, or probability of occurrence. If this probability changes over time, or for certain periods of time, the compression rate will necessarily change, and possibly result in greater memory usage—i.e., if GNSS signal conditions result in, for example, a series of +3 and −3's being output from ADC 430, meaning the probability of those outputs have at least temporarily changed, using three bits for each digital signal sample will be wasteful of memory, rather than reducing memory usage.

Because of this, embodiments of the present invention use an adaptive system to monitor the GNSS signal conditions in order to change one or more parameters of the compression/decompression process when and if desirable and/or necessary.

Figure 5:
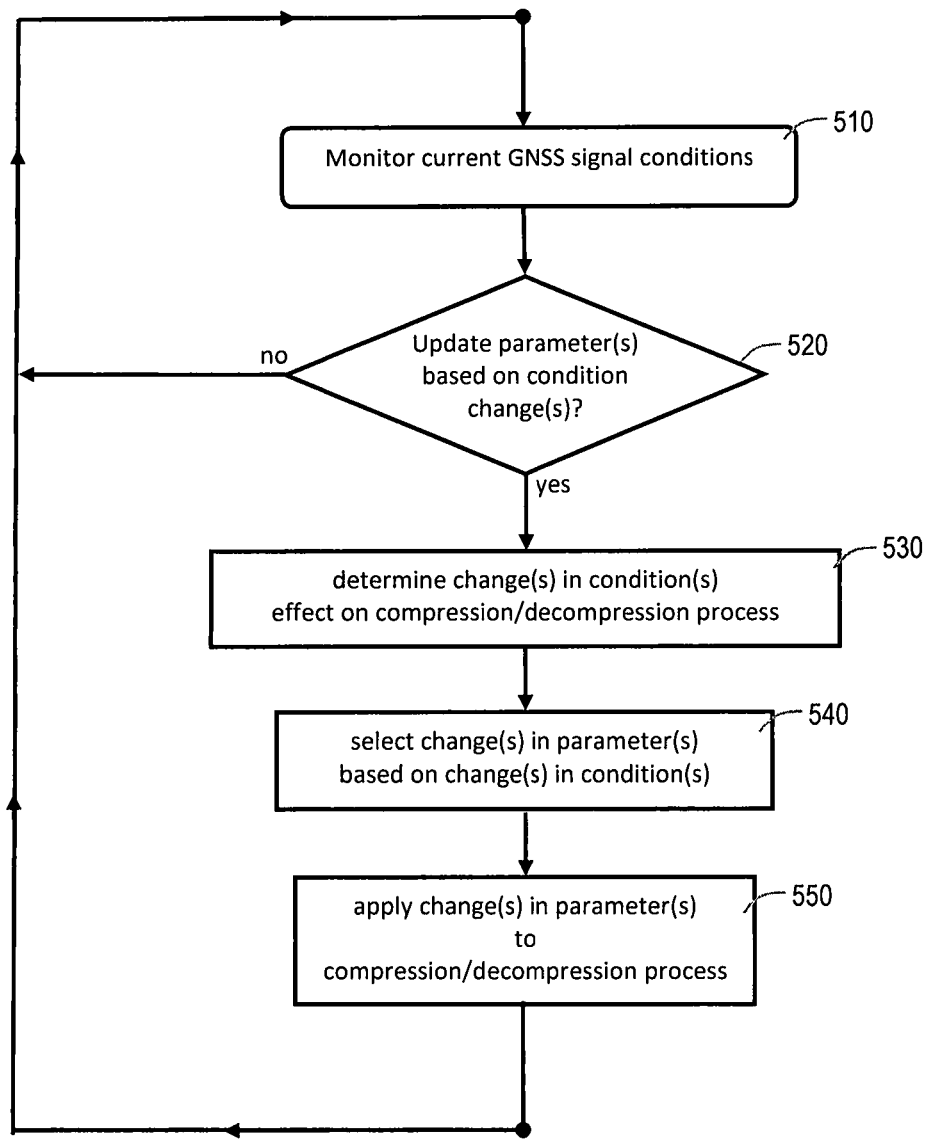
FIG. 5 is a flowchart for a method for adapting GNSS digital signal sample compression based on GNSS signal conditions according to an embodiment of the present invention.

An adaptive method for GNSS signal compression according to an embodiment of the present invention is shown in FIG. 5. The embodiment in FIG. 5 assumes that the Huffman compression/decompression algorithm as described above is already being applied in the GNSS receiver using a system such as the example shown in FIG. 4. Thus, the method in FIG. 5 is a closed loop which will continually run while the GNSS receiver components are being used. Of course, in other embodiments, the monitoring and/or changes to parameters may be periodic, and/or the compression/decompression process itself may be turned on and off based on one or more system conditions.

In step 510 of FIG. 5, GNSS signal conditions are monitored. In terms of using the Huffman coding, the more relevant GNSS signal conditions are those that would result in, for example, a series of +3 and −3's being output from ADC 430, thereby at least temporarily changing the probability of those outputs. In step 520, it is determined whether a change in GNSS signal conditions warrants a change in one or more parameters of the compression/decompression process presently being used. If it does not, the method loops back to step 510 to continue monitoring.

Figure 7:
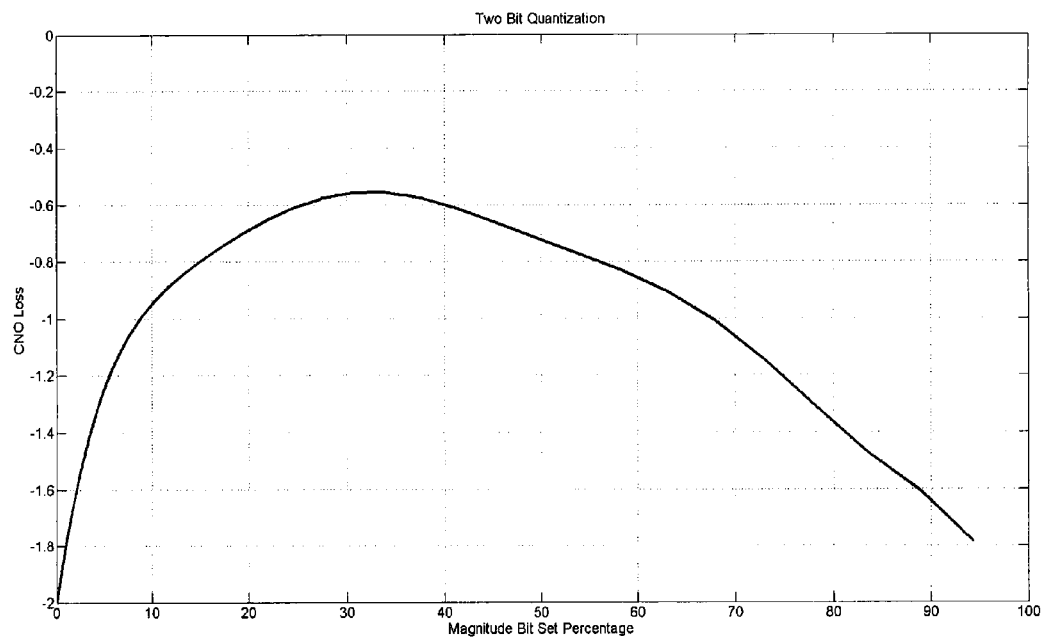
FIG. 7 is a graph of $C/N_O$ loss point vs. magnitude bit set percentage for a two-bit sample, which may be used to change parameters of the compression/decompression process according to an embodiment of the present invention.

If it is determined in step 520 that GNSS signal conditions warrant a change in one or more parameters of the compression/decompression process, it is determined in step 530 what effect/change the change(s) in condition(s) will have on the compression/decompression process. For example, an appropriate new $C/N_O$ loss point on the graph of FIG. 7 would be determined based on current GNSS signal conditions. Originally, i.e., in Table 2, the most minimal $C/N_O$ loss point was assumed (the highest part of the curve in FIG. 7), resulting in around a 30 magnitude bit set percentage, as shown in FIG. 7. Now, GNSS signal conditions have changed, resulting in around −0.7 $C/N_O$ loss, and the $C/N_O$ loss point at −0.7 with around a 20 magnitude bit set percentage, as shown in FIG. 7, is selected, meaning that the probable occurrence of +/−3 has changed from 30% to 20%.

In step 540, the change(s) in condition(s) determined in step 530 are used to determine the change(s) in one or more parameters. Continuing with FIG. 7 and the example of Huffman coding, the selected $C/N_O$ loss point indicated a 20 magnitude bit set percentage, meaning that now $P(+3)+P(-3) \approx 0.20$, while $P(+1)+P(-1) \approx 0.80$. Thus, in this example, the change in parameters would be a new Huffman alphabet, based on these new percentages. As shown in the example of single and double 2-bit samples illustrated in FIG. 6, a 20/80 split would result in an even higher compression: 10% for single 2-bit samples and 12.5% for double 2-bit samples.

In step 550, the appropriate changes are made to the compression algorithm, e.g., the new Huffman coding alphabet is now applied to the digital samples. Following the example of single and double 2-bit samples from above, this would be equivalent to recalculated new values for Tables 1 and 2 based on the new percentages. After step 550, the method loops back to step 510 to continue monitoring.

In embodiments of the present invention using an adaptive method and/or system to change the compression algorithm based on GNSS signal and/or GNSS system conditions, the timing of the change in compression algorithm will need to be synchronized between Compression Module 480 and Decompression Module 485. For example, in an embodiment of the present invention using Huffman coding, if Compression Module 480 changes the codeword for −3 at time $t_0$, Decompression Module 485 needs to start recognizing the new codeword when it decodes any of the samples stored on and after time $t_0$ in memory 450. This may be accomplished by a variety of means, as is well-known to one of ordinary skill in the art.

Although the embodiment discussed in reference to FIG. 5 uses Huffman coding, the method would apply equally to any appropriate compression algorithm used in an embodiment of the present invention. Moreover, the method according to other embodiments of the present invention could monitor other system conditions, such as memory usage, in addition to, or instead of, GNSS signal conditions in step 510, and perform the subsequent steps in FIG. 5 with those monitored system conditions in addition to, or replacing, the GNSS signal conditions, in order to make the appropriate changes to the compression algorithm based on those other monitored system conditions. Thus, for example, in an embodiment using Huffman coding, if memory 450 suddenly begins to use a great deal more storage, the method according to that embodiment of the present invention could change the Huffman coding parameters (such as, e.g., the alphabet) without direct monitoring of GNSS signal conditions. Such an embodiment might use statistical analysis of memory usage over time to make rapid changes to the compression algorithm when needed.

While several embodiments have been described, it will be understood that various modifications can be made without departing from the scope of the present invention. Thus, it will be apparent to those of ordinary skill in the art that the invention is not limited to the embodiments described, but can encompass everything covered by the appended claims and their equivalents.

What is claimed is:

1. A method for a receiver of signals from a satellite navigational system, comprising:
receiving a signal from one or more satellites in the satellite navigational system;
sampling the signal to output digital signal samples, each digital signal sample having N bits;
encoding the digital signal samples to an average encoded sample size less than N bits;
storing the encoded digital signal samples;
monitoring one or more conditions of at least one of the receiver and the satellite navigational system, wherein the one or more monitored conditions include received-carrier-power-to-receiver-noise-power-density ($C/N_O$);
retrieving and decoding the stored encoded digital signal samples, each decoded digital signal sample having N bits, wherein the encoding and the decoding is lossless;

processing the decoded digital signal samples to generate at least one of a navigational, position, and timing solution from the received signal;

determining if one or more parameters for at least one of coding and decoding the digital signal samples should be changed based on the monitored conditions; and changing one or more parameters for at least one of coding and decoding the digital signal samples if it is determined the one or more parameters should be changed based on the monitored conditions.

2. The method of claim 1, wherein the digital signal samples are encoded by a Huffman code.

3. The method of claim 1, wherein the digital signal samples are encoded by a Huffman code and the one or more parameters comprise a new Huffman coding alphabet.

4. A method for a receiver of signals from a satellite navigational system, comprising:

receiving a signal from one or more satellites in the satellite navigational system;

sampling the signal to output digital signal samples;

encoding the digital signal samples;

storing the encoded digital signal samples;

monitoring one or more conditions of at least one of the receiver and the satellite navigational system, wherein the monitored conditions comprise a received-carrier-power-to-receiver-noise-power-density ($C/N_O$);

retrieving and decoding the stored digital signal samples;

processing the decoded digital signal samples to generate at least one of a navigational, position, and timing solution from the signal received from the one or more satellites in the satellite navigational system;

determining, based on the monitored conditions, if one or more parameters of at least one of coding and decoding the digital signal samples should be changed; and changing one or more parameters for at least one of coding and decoding the digital signal samples if it is determined the parameters should be changed based on the monitored conditions.

5. The method of claim 4, wherein the monitored conditions also comprise an average size of the digital signal samples.

6. A satellite navigational system receiver, comprising:

at least one antenna configured to receive a signal from one or more satellites in a satellite navigational system;

an analog-to-digital convertor (ADC) configured to sample the received signal and to output digital signal samples, each digital signal sample having N bits;

an encoder which encodes the digital signal samples to an average encoded sample size less than N bits;

a memory configured to store the encoded digital signal samples;

a decoder which decodes the stored encoded digital signal samples, each decoded digital signal sample having N bits; and a processor configured to:

monitor one or more conditions of at least one of the receiver and the satellite navigational system, wherein the one or more monitored conditions include received-carrier-power-to-receiver-noise power-density ($C/N_O$), process the decoded digital signal samples to generate at least one of a navigational, position, and timing solution from the signal received from the one or more satellites in the satellite navigational system, determine if one or more parameters for at least one of coding and decoding the digital signal samples should be changed based on the monitored conditions; and changing one or more parameters for at least one of coding and decoding the digital signal samples if it is determined the one or more parameters should be changed based on the monitored conditions, wherein the encoder and the decoder use lossless coding.

7. A portable device, comprising:

at least one antenna configured to receive a signal from one or more satellites in a satellite navigational system;

an analog-to-digital convertor (ADC) configured to sample the received signal and to output digital signal samples, each digital signal sample having N bits;

a memory configured to store the digital signal samples; and one or more processors; and at least one non-transitory computer-readable medium having program instructions recorded thereon, the program instructions configured to have the one or more processors perform the steps of:

coding the digital signal samples output by the ADC, prior to storage in the memory, to an average encoded sample size less than N bits; and decoding the encoded digital signal samples when retrieved from memory, each decoded digital signal sample having N bits, monitor one or more conditions of at least one of the receiver and the satellite navigational system, wherein the one or more monitored conditions include received-carrier-power-to-receiver-noise-power-density ($C/N_O$), determine if one or more parameters for at least one of coding and decoding the digital signal samples should be changed based on the monitored conditions; and changing one or more parameters for at least one of coding and decoding the digital signal samples if it is determined the one or more parameters should be changed based on the monitored conditions, wherein the encoding and decoding is lossless.

8. A satellite navigational system, comprising:

a receiver comprising:

at least one antenna configured to receive a signal from one or more satellites in a satellite navigational system;

an analog-to-digital convertor (ADC) configured to sample the received signal and to output digital signal samples, each digital signal sample having N bits;

an encoder which encodes the digital signal samples to an average encoded sample size less than N bits; and a transmitter configured to transmit the encoded digital signal samples; and a remote processing unit comprising:

a receiver configured to receive the transmitted encoded digital signal samples;

a decoder which decodes the received digital signal samples, each decoded digital signal sample having N bits; and a processor configured to process the decoded digital signal samples to generate at least one of a navigational, position, and timing solution from the signal received from the one or more satellites in the satellite navigational system, wherein the encoder and the decoder use lossless coding, wherein one or more conditions of at least one of the receiver and the satellite navigational system are monitored, wherein the one or more monitored conditions include received-carrier-power-to-receiver-noise-power-density ($C/N_O$), and wherein, if it is determined one or more parameters for at least one of coding and decoding the digital signal samples should be changed based on the monitored conditions, changing one or more parameters for at least one of coding and decoding the digital signal samples based on the monitored conditions.

9. The method of claim 1, wherein the monitored conditions also include an average size of the digital signal samples.

10. The method of claim 1, wherein the monitored conditions also include an average size of the encoded digital signal samples.

11. The method of claim 1, wherein the monitored conditions also include one or more probabilities of symbols forming the digital signal samples.

12. The method of claim 4, wherein the monitored conditions also comprise an average size of the encoded digital signal samples.

13. The method of claim 4, wherein the monitored conditions also comprise one or more probabilities of symbols forming the digital signal samples.

14. The method of claim 4, wherein the digital signal samples are encoded by a Huffman code and the one or more parameters comprise a new Huffman coding alphabet.

15. The satellite navigational system receiver of claim 6, wherein the digital signal samples are encoded by a Huffman code and the one or more parameters comprise a new Huffman coding alphabet.

16. The satellite navigational system receiver of claim 6, wherein the monitored conditions also include at least one of an average size of the digital signal samples, an average size of the encoded digital signal samples, and one or more probabilities of symbols forming the digital signal samples.

17. The portable device of claim 7, wherein the digital signal samples are encoded by a Huffman code and the one or more parameters comprise a new Huffman coding alphabet.

18. The portable device of claim 7, wherein the monitored conditions also include at least one of an average size of the digital signal samples, an average size of the encoded digital signal samples, and one or more probabilities of symbols forming the digital signal samples.

19. The satellite navigational system of claim 8, wherein the digital signal samples are encoded by a Huffman code and the one or more parameters comprise a new Huffman coding alphabet.

20. The satellite navigational system of claim 8, wherein the monitored conditions also include at least one of an average size of the digital signal samples, an average size of the encoded digital signal samples, and one or more probabilities of symbols forming the digital signal samples.

* * * * *